United States Patent [19]

Kitazume et al.

[11] Patent Number: 4,922,752

[45] Date of Patent: May 8, 1990

[54] FLATNESS INTEGRATING/RECORDING APPARATUS

[75] Inventors: Masahiro Kitazume, Yokohama; Makoto Aoki, Tokyo; Hiroshi Nogi; Kazuya Homma, both of Yokohama; Shigemi Matsuzawa, Kawasaki, all of Japan

[73] Assignee: Tokyo Keiki Co., Ltd., Tokyo, Japan

[21] Appl. No.: 239,652

[22] Filed: Sep. 2, 1988

[30] Foreign Application Priority Data

Sep. 4, 1987 [JP] Japan .......................... 62-135398[U]
Aug. 30, 1988 [JP] Japan ................................ 63-215810

[51] Int. Cl.⁵ ............................................ G01B 11/24
[52] U.S. Cl. ........................................ 73/146; 356/376
[58] Field of Search .................. 73/146; 356/376, 371; 364/507

[56] References Cited

U.S. PATENT DOCUMENTS 4,653,316 3/1987 Fukuhara .............................. 73/146
4,658,639 4/1987 Arnberg ................................ 73/146
4,796,998 1/1989 Soma et al. .......................... 73/146

Primary Examiner—Donald O. Woodiel
Attorney, Agent, or Firm—Sandler, Greenblum & Bernstein

[57] ABSTRACT

A flatness integrating/recording apparatus of the present invention includes a car than can travel on a road surface, a device associated with the wheel of the car for calculating the travelled distance of the car, and an optical road surface irregularities measuring device provided on the car. The data obtained from these devices is processed by first and second signal processing portions so as to calculate the travelled distance and the irregularities of the road surface. The data output from the first and second signal processing portions is supplied to a display device and to a data storage portion. A set value inputting device for setting measuring conditions is provided in the tractor portion of the car. The output of the set value inputting device is supplied to the second signal processing portion.

19 Claims, 5 Drawing Sheets

FLATNESS INTEGRATING/RECORDING APPARATUS

BACKGROUND OF THE INVENTION

1. Field of the Invention

The present invention relates to a flatness integrating/recording apparatus, and, more particularly, to a flatness integrating/recording apparatus for measuring the flatness of a road surface or the like and for recording the result of measurement.

2. Description of the Prior Art

Figure 7:
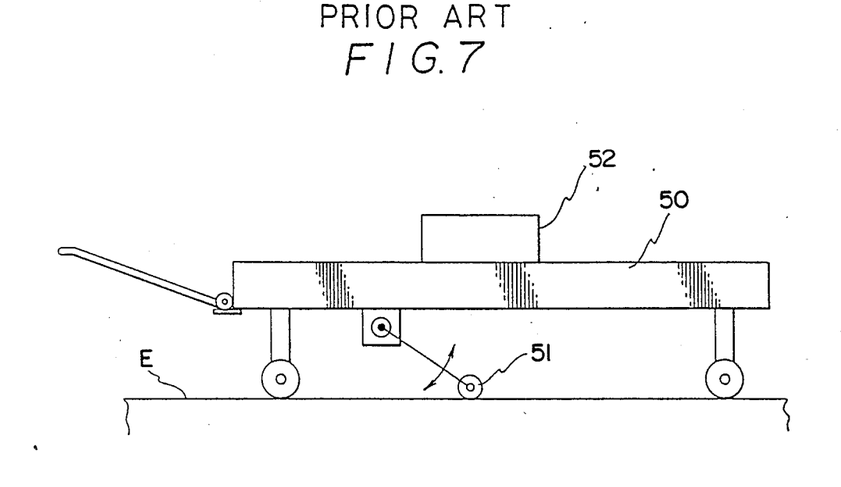
FIG. 7 shows the structure of a conventional flatness integrating/recording appartus.

A flatness integrating/recording apparatus such as that shown in FIG. 7 is known. This apparatus includes a car 50, a measuring wheel 51 provided substantially at the center of the lower surface of the car 50 in such a manner as to be in contact with the road surface, and a recorder 52 mounted on the car 50. When an operator hauls the car 50 in the leftward direction as viewed in FIG. 1, the recorder 52 mounted on the car 50 starts to record the vertical movement of the measuring wheel 51 which occurs as the car 50 progresses as the irregularities of the road surface.

In this apparatus, the tire of the measuring wheel 51 makes contact with the road surface and rotates. Therefore, the measuring wheel 51 will not faithfully follow surface irregularities if the car 50 travels at high speed, making measurement of fine irregularities impossible. Further, the data recorded on the recording paper must be analyzed so as to obtain data representing irregularities, increasing the likelihood that there will be errors when reading the data. Loss of recorded data often occurs during measurement due to shortage of ink in the recorder or for other reasons as the work is often conducted outdoors. The apparatus is a mechanically operated one, and it be therefore required that adjustment or inspection of the components is done before measurement. This is rather troublesome work, and is particularly inconvenient when the measurement work is restarted after an interruption.

SUMMARY OF THE INVENTION

In view of the aforementioned problems of the conventional apparatus, an object of the present invention is to provide a flatness integrating/recording apparatus which is capable of high-speed measurement, and which enables data to be recorded on the recording paper quickly, easily and repeatedly.

To this end, the present invention provides a flatness integrating/recording apparatus which comprises:

a car which can travel on a road surface, said car having a tractor portion at the forward end thereof and wheels on the lower surface thereof;

a travelled distance measuring means mounted on one of the wheels, an optical road surface irregularities detecting means provided on the car;

first and second signal processing portions for processing data from the travelled distance measuring means and from the road surface irregularities detecting means, a set value inputting means incorporating a data storage portion for storing the data from the first and second signal processing portions, the set value inputting means setting predetermined measurement conditions employed in said second signal processing portion; and a measurement result displaying means connected to the data storage portion.

DETAILED DESCRIPTION OF THE PREFERRED EMBODIMENTS

A first embodiment of the present invention will be described below with reference to FIGS. 1 to 4.

Figure 1:
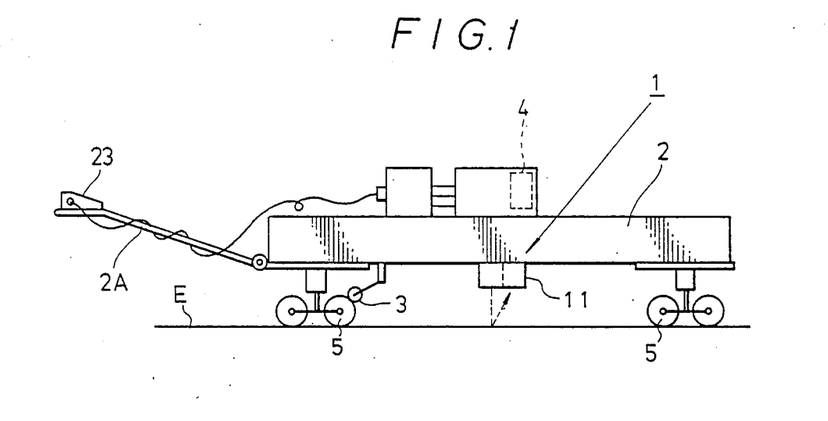
FIG. 1 illustrates the structure of a flatness integrating/recording apparatus, showing a first embodiment of the present invention.

Referring first to FIG. 1, a flatness integrating/recording apparatus includes a non-contact type road surface flatness measuring means 1, and a car 2 with the road surface flatness measuring means constituted by a sensor portion being attached to the central portion thereof in such a manner as to be directed downwardly, the forward end of the car 2 being provided with a tractor portion 2A.

The road surface flatness measuring means 1 in turn includes a laser receiving/transmitting portion 11 for transmitting and receiving a laser which serves as the sensor portion, and first and second data processing portions for processing a received signal. The laser receiving/transmitting portion 11 employed in this embodiment is of a type composed of a laser diode serving as a signal transmitter 11A, and a one-dimensional CCD sensor serving as a signal receiver 11B.

The car 2 comprises a four-wheel car which is relatively elongated in the direction of travel. The car 2 can be hauled by manpower or an automobile through the tractor portion 2A. FIG. 1 shows a car being hauled by manpower.

An encoder 3 which serves as a travelled distance measuring means is provided below the car 2 in such a manner that it can be associated with one of the car bearing wheels provided at the leg portions of the car 2. The data output from the encoder 3 and the road surface flatness measuring means 1 is stored in a data storage portion 37 incorporated in a set value inputting means 23. A printer 4 serving as a display means for recording the data obtained is mounted on the car 2.

The travelled distance measuring encoder 3 may be of a type which is directly coupled to a wheel of the car 2. However, the present embodiment employs an encoder which contacts the periphery of the wheel while rolling thereon and thereby measures not the angle of rotation of the wheel but the amount travelled by the periphery of the wheel which does not vary even when there is a change in the external form (in particular, the diameter) of the wheel due to the wear that occurs during travel. This allows the encoder 3 to perform accurate and high-precision measurement of the travelled distance.

A first signal processing portion 20 for processing a signal output from the encoder 3 and for calculating and displaying the travelled distance of the car 2 is mounted on the car 2.

The output signal of the encoder 3 is also supplied to an exciting circuit 30 (to be described later) as a reference signal which is used to start the operation of the road surface irregularities measuring means.

Figure 2:
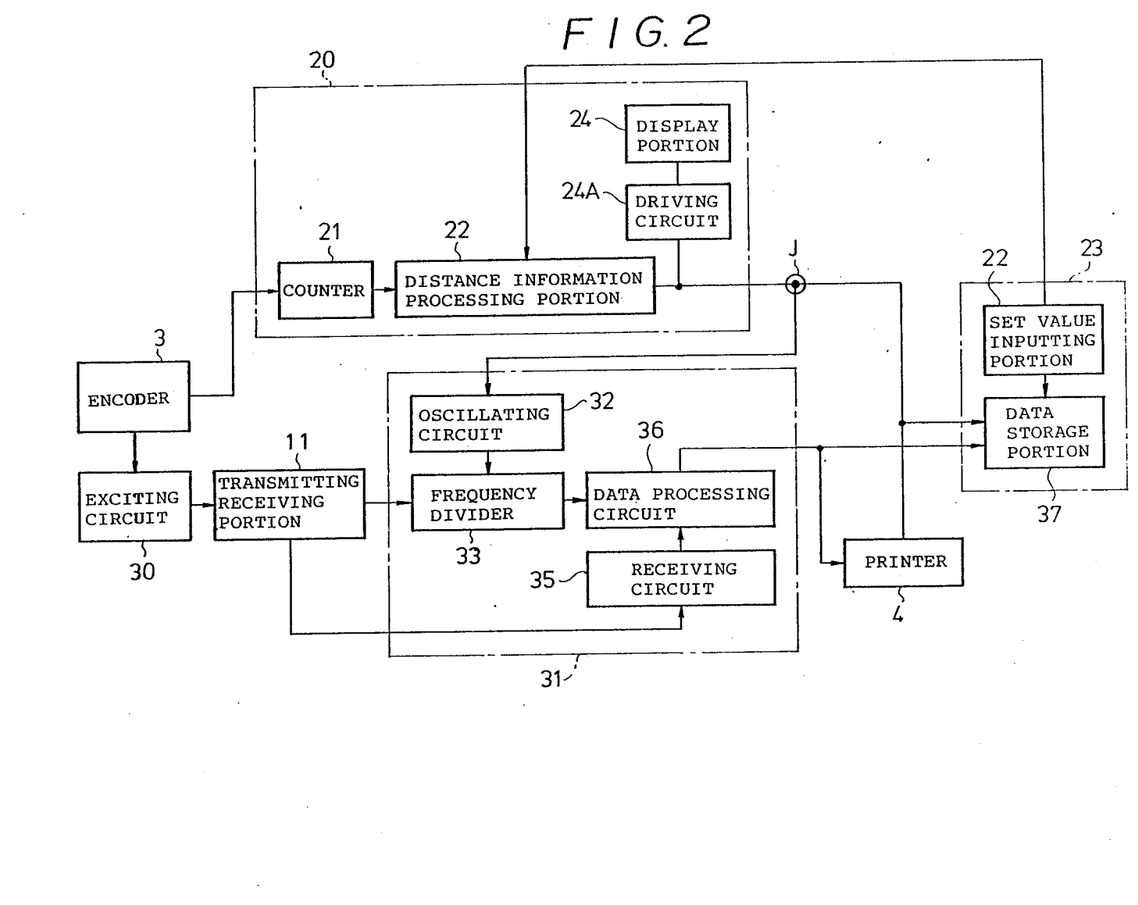
FIG. 2 is a diagram of the circuitry of the first embodiment.
Figure 3:
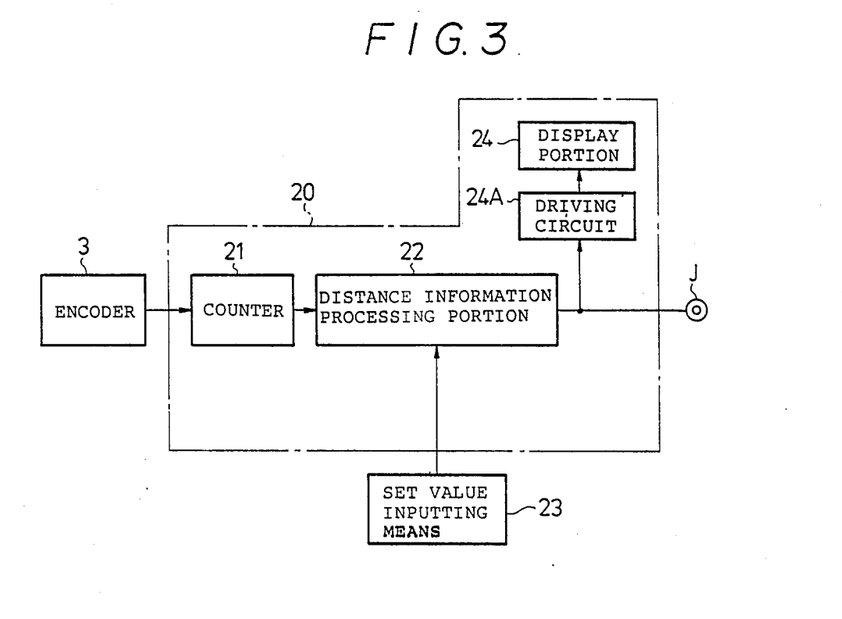
FIG. 3 is a circuit diagram of a first signal processing system.

As shown in FIGS. 2 and 3, the first signal processing portion 20 includes a counter 21 for counting the pulses output from the encoder 3, a distance information processing portion 22 for converting the output of the counter 21 to a predetermined display signal, a set value inputting means 23 for regulating the operation of the distance information processing portion 22, and a display portion 24 that is energized by the output of the distance information processing portion 22 to display the distance information. The data which represents the interval of 10 m or 20 m or the data representing the number of locations at which the measurement is conducted may be input by the set value input means 23. In this embodiment, the set value input means 23 is provided in the tractor portion 2A of the car 2. The distance information processing portion 22 processes the signal input from the counter 21 in accordance with the conditions (including the timing of marking) set by the set value inputting means 23 and outputs a display signal to display the measured position. At the same time, the distance information processing portion 22 outputs the same signal through a terminal J to an oscillating circuit 32 in a measured data processing portion 31 which serves as a second signal processing portion (see FIGS. 2 and 3) and to the data storage portion 37 in the set value inputting means 23.

The display signal output from the distance information processing portion 22 energizes a drive circuit 24A connected to the input terminal of the display portion 24 shown in FIG. 3 and thereby drive the display portion 24 which may be composed of a light-emitting element and a buzzer.

Figure 4:
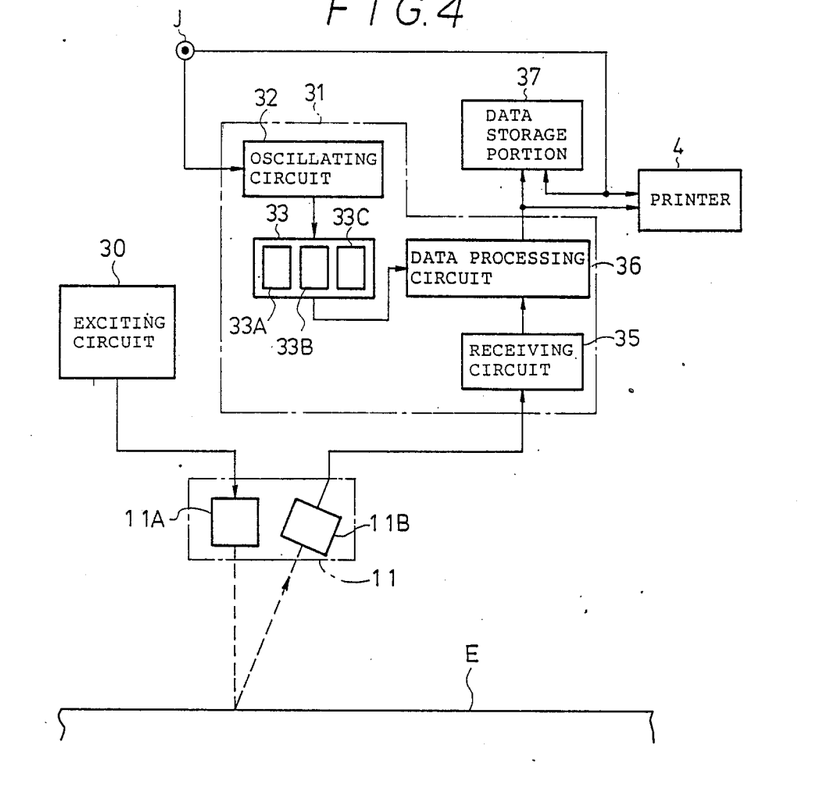
FIG. 4 is a circuit diagram of a second signal processing system.

As shown in FIG. 4, the exciting circuit portion 30 is connected to the laser transmitting portion 11A of the laser transmitting/receiving portion 11 so as to cause it to continuously output a laser of a predetermined level. The laser receiving portion 11B is connected to the measured data processing portion 31 for processing a received laser so as to detect the information representing the irregulaties of the road surface E.

The measured data processing portion 31 includes the oscillating circuit 32 for outputting pulses, and a frequency divider 33. The frequency of a timing signal which is output from the oscillating circuit 32 is regulated by the encoder 3. The frequency divider 33 of this embodiment is in turn composed of a plurality of frequency dividers 33A, 33B, and 33C which are switched over as required, as shown in FIG. 4.

The measured data processing portion 31 further includes a receiving circuit 35 and a data processing circuit 36. The data processing circuit 36 receives the signal from the frequency divider 33, and operates in synchronizm with that signal to detect information representing the irregularities from the signal supplied from the receiving circuit 35. The detection signal of the data processing circuit 36 is output to the printer 4 and to the data storage portion 37.

If the speed at which the laser transmitting/receiving portion 11 travels is constant, the exciting circuit 30 outputs pulses at a frequency determined by the encoder 3 and the frequency divider 33. The data processing circuit 36 operates in synchronism with this frequency to process the data input and outputs the processed data to the data storage portion 37. Therefore, the repetition rate at which the distance data is stored in the data storage portion 37 is constant.

On the other hand, as the speed at which the car 2 travels increases, the rotational speed of the encoder 3 increases in proportion to the travelling speed, increasing the amount of information stored in the data memory 37. In consequence, the distance interval at which the measurement is conducted remains the same even when the speed of measurement of the flatness of the road surface is increased, making high-speed and highly accurate measurement possible. Further, the time intervals of the measurement can be changed by suitably selecting the frequency dividers 33A, 33B or 33C which is capable of dividing the frequency of the pulses by a different fixed value.

The data storage portion 37 of this embodiment is composed of a floppy disk and a writing mechanism. However, an IC card (a RAM cart) or a bubble memory may also be employed.

Thus, the present embodiment has the following advantages:

(1) An optical detecting means is employed, and the output signal is electrically processed. In consequence, the time required for preparations for measurement can be reduced.

(2) If the measurement has to be interrupted to move the apparatus from one place to another for some reason, it can be done quickly with the measuring operation being able to be restarted quickly for the reason mentioned above.

(3) The direction of movement of the measuring portion can be easily changed.

(4) The marking operating portion is within easy reach of an operator.

(5) Marking can be done without opening the lid of the printer, making the apparatus waterproof.

(6) Tabulating work of the obtained data can be simplified (can be completed in a short time) if a personal computer is used.

(7) A highly reliable measurement is possible.

In the present embodiment, since the output from the encoder 3 is supplied to the road surface flatness measuring means 1 through the frequency divider 33 where it is used as a starting signal (not shown) therefor, selection of the number of measurements which are conducted between one measured point and a subsequent point is possible. The present invention can also be applied without alteration to the measurement of the irregularities of the ground surface.

Figure 5:
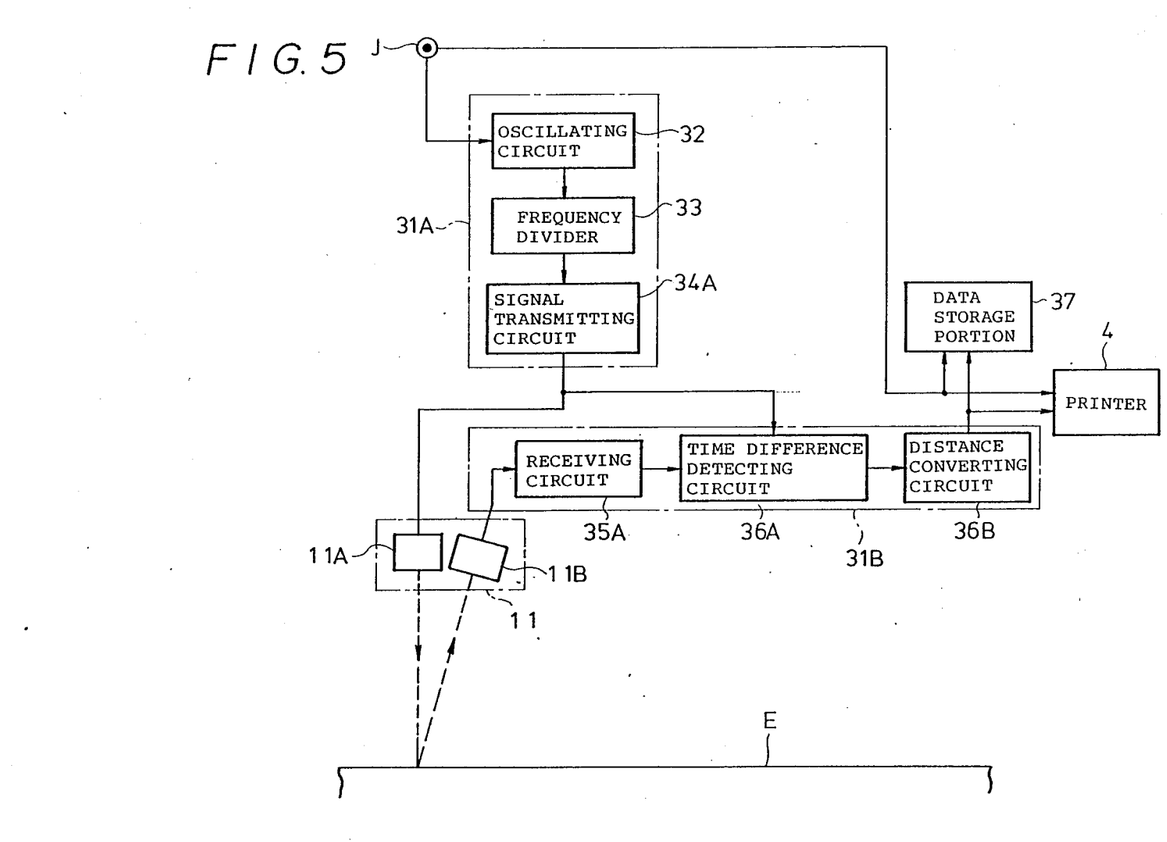
FIG. 5 is a circuit diagram of another example of the second signal processing system.

FIG. 5 shows another example of the second signal processing portion. The output of a signal transmitting circuit 34A in a signal output portion 31A is input to the transmitting portion 11A so as to cause it to output a laser. The output of the signal transmitting circuit 34A is also input to a time difference detecting circuit 36A for detecting the time difference between this signal and the signal sent from a receiving circuit 35A. The output signal of the time difference detecting circuit 36A is input to a distance converting circuit 36B where it is converted to a distance. The obtained data is then stored in the data storage memory 37. Reference numeral 31B denotes a signal processing portion.

Other structure of this embodiment is the same as that of the first embodiment shown in FIG. 4.

The second embodiment is operated substantially in the same manner as that of the first embodiment. However, the second embodiment has the advantage that detection result is not affected by a change in the sensitivity of the apparatus because the irregularities of the road surface is detected utilizing the time difference.

Figure 6:
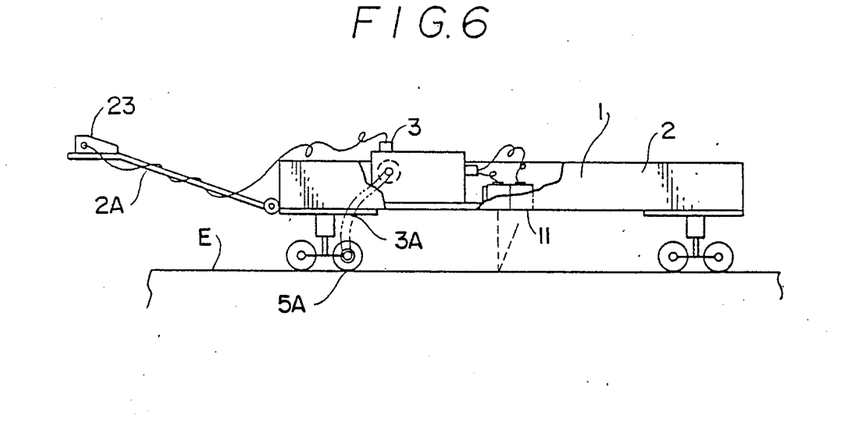
FIG. 6 shows another example of mounting of an encoder.

FIG. 6 shows another example of the travelled distance measuring means.

Whereas in the first embodiment the encoder 3 makes contact with the outer periphery of the wheel 5 and the travelled distance is measured on the basis of the output signal of the encoder 3, this embodiment includes a flexible shaft 3A for transmitting the rotational force which is coupled to a wheel 5A on one end and to the encoder 3 mounted on the car 2 at the other end thereof. Other structure of this embodiment is the same as that of the first embodiment.

In this embodiment, breakage of the encoder 3 which is caused by being hit by a foreign matter can be prevented.

The flexible shaft 3A may be replaced by other transmitting means such as a chain mechanism.

As will be understood from the foregoing description, in the present invention, continuous measurement can be made possible by using a laser. In consequence, the road surface irregularities can be measured with a high degree of accuracy and at high speed, speeding up the measuring operation. Further, since the obtained data is stored in the data storage portion, it can be fetched at a desired time and in desired number of times so that it is input to a computer, enabling calculation of the irregularities to be done quickly and effectively.

What is claimed is:

1. An apparatus for integrating/recording the flatness of a road surface, comprising:
    a car that can travel on the road surface, said car having a tractor portion at the forward end and wheels on the lower surface thereof;
    a travelled distance measuring means connected to one of said wheels;
    an optical road surface irregularities measuring means mounted on said car;
    first and second signal processing portions for processing data from said travelled distance measuring means and said road surface irregularities measuring means, respectively;
    a set value inputting means incorporating a data storage portion for storing the data from said first and second signal processing portions, said set value inputting means additionally setting predetermined measuring conditions employed in said second signal processing portion; and
    a measurement result display means connected to said data storage portion.

2. A flatness integrating/recording apparatus according to claim 1, wherein said travelled distance measuring means comprises an encoder which makes contact with said wheel while rolling thereon.

3. A flatness integrating/recording apparatus according to claim 1, wherein said travelled distance measuring means comprises an encoder which is coupled to said wheel through a rotational force transmitting means.

4. A flatness integrating/recording apparatus according to claim 1, wherein the output signal of said travelled distance measuring means is used as a reference signal which starts the operation of said road surface irregularities measuring means.

5. A flatness integrating/recording apparatus according to claim 1, wherein said set value inputting means is provided in said tractor portion of said car.

6. A flatness integrating/recording apparatus according to claim 1, wherein said set value inputting means has the function of setting the number of locations at which measurement is performed.

7. A flatness integrating/recording apparatus according to claim 1, wherein said first signal processing portion is designed to process the output of said travelled distance measuring means and to output a signal to display the position for measurement, said first signal processing portion also outputting the same signal to said second signal processing portion and to said set value inputting means at the same time.

8. A flatness integrating/recording apparatus according to claim 1, wherein said display means comprises a printer which is connected to said first and second signal processing portions to display the data obtained by said signal processing portions.

9. A flatness integrating/recording apparatus according to claim 1, wherein said second signal processing portion includes a time difference detecting circuit which detects the time difference between the transmission and receipt of an optical signal emitted toward the road surface.

10. An apparatus for integrating/recording the flatness of a road surface, comprising:
    a car that can travel on the road surface, said car having a tractor portion at the forward end and wheels on the lower surface thereof;
    a travelled distance measuring means connected to one of said wheels; said travelled distance measuring means comprising an encoder which makes contact with said wheel while rolling thereon;
    an optical road surface irregularities measuring means mounted on said car;
    first and second signal processing portions for processing data from said travelled distance measuring means and said road surface irregularities measuring means, respectively;
    a set value inputting means incorporating a data storage signal processing portions, said set value inputting means setting predetermined measuring conditions employed in said second signal processing portion; and
    a measurement result display means connected to said data storage portion.

11. An apparatus for integrating/recording the flatness of a road surface, comprising:
    a car that can travel on the road surface, said car having a tractor portion at the forward end and wheels on the lower surface thereof;
    a travelled distance measuring means connected to one of said wheels, said travelled distance measuring means comprising an encoder which is coupled to said wheel through through a rotational force transmitting means;
    an optical road surface irregularities measuring means mounted on said car;
    first and second signal processing portions for processing data from said travelled distance measuring means and said road surface irregularities measuring means, respectively;
    a set value inputting means incorporating a data storage portion for storing the data from said first and second signal processing portions, said set value inputing means setting predetermined measuring conditions employed in said second signal processing portion; and a measurement result display means connected to said data storage portion.

12. A flatness integrating/recording apparatus according to claim 11, wherein said encoder is provided in said car.

13. A flatness integrating/recording apparatus according to claim 11, wherein said rotational force transmitting means comprises a flexible shaft.

14. An apparatus for integrating/recording the flatness of a road surface, comprising:
- a car that can travel on the road surface, said car having a tractor portion at the forward end and wheels on the lower surface thereof;
- a travelled distance measuring means connected to one of said wheels, said travelled distance measuring means comprising an encoder which is coupled to said wheel through through a rotational force transmitting means;
- an optical road surface irregularities measuring means mounted on said car;
- first and second signal processing portions for processing data from said travelled distance measuring means and said road surface irregularities measuring means, respectively, wherein the output signal of said travelled distance measuring means is used as a reference signal which starts operation of said road surface irregularities measuring means;
- a set value inputting means incorporating a data storage portion for storing the data from said first and second signal processing portions, said set value inputting means setting predetermined measuring conditions employed in said second signal processing portion; and
- a measurement result display means connected to said data storage portion.

15. An apparatus for integrating/recording the flatness of a road surface, comprising:
- a car that can travel on the road surface, said car having a tractor portion at the forward end and wheels on the lower surface thereof;
- a travelled distance measuring means connected to one of said wheels;
- an optical road surface irregularities measuring means mounted on said car;
- first and second signal processing portions for processing data from said travelled distance measuring means and said road surface irregularities measuring means;
- a set value inputting means being provided in said tractor portion of said car and incorporating a data storage portion for storing the data from said first and second signal processing portions, said set value inputting means setting predetermined measuring conditions employed in said second signal processing portion; and
- a measurement result display means connected to said data storage portion.

16. An apparatus for integrating/recording the flatness of a road surface, comprising:
- a car that can travel on the road surface, said car having a tractor portion at the forward end and wheels on the lower surface thereof;
- a travelled distance measuring means connected to one of said wheels;
- an optical road surface irregularities measuring means mounted on said car;
- first and second signal processing portions for processing data from said travelled distance measuring means and said road surface irregularities measuring means, respectively;
- a set value inputting means incoporating a data storage portion for storing the data from said first and second signal processing portions, said set value inputting means setting predetermined measuring conditions employed in said second signal processing portion, wherein said set value inputting means has the function of setting the number of locations at which measurement is performed; and
- a measurement result display means connected to said data storage portion.

17. An apparatus for inegrating/recording the flatness of a road surface, comprising:
- a car that can travel on the road surface, said car having a tractor portion at the forward end and wheels on the lower surface thereof;
- a travelled distance measuring means connected to one of said wheels;
- an optical road surface irregularities measuring means mounted on said car;
- first and second signal processing portions for processing data from said travelled distance measuring means and said road surface irregularities measuring means, respectively;
- a set value inputting means incorporating a data storage portion for storing the data from said first and second signal processing portions, said set value inputting means setting predetermined measuring conditions employed in said second signal processing portion, wherein said first signal processing portion processes the output of said travelled distance measuring means and outputs a signal to display the position for measurement, said first signal processing portion also outputting the same signal to said second signal processing portion and to said set value inputting means at the same time; and
- a measurement result display means connected to said data storage portion.

18. An apparatus for integrating/recording the flatness of a road surface, comprising:
- a car that can travel on the road surface, said car having a tractor portion at the forward end and wheels on the lower surface thereof;
- a travelled distance measuring means connected to one of said wheels;
- an optical road surface irregularities measuring means mounted on said car;
- first and second signal processing portions for processing data from said travelled distance measuring means and said road surface irregularities measuring means, respectively;
- a set value inputting means incorporating a data storage portion for storing the data from said first and second signal processing portions, said set value inputting means setting predetermined measuring conditions employed in said second signal processing portion; and
- a measurement result display means connected to said data storage portion, said display means comprising a printer which is connected to said first and second signal processing portions to display the data obtained by said signal processing portions.

19. An apparatus for integrating/recording the flatness of a road surface, comprising:

a car that can travel on the road surface, said car having a tractor portion at the forward end and wheels on the lower surface thereof;

a travelled distance measuring means connected to one of said wheels;

an optical road surface irregularities measuring means mounted on said car;

first and second signal processing portions for processing data from said travelled distance measuring means and said road surface irregularities measuring means, respectively, said second signal processing portion including a time difference detecting circuit which detects the time difference between the transmission and receipt of an optical signal emitted toward the road surface;

a set value inputting means incorporating a data storage portion for storing the data from said first and second signal processing portions, said set value inputting means setting predetermined measuring conditions employed in said second signal processing portion; and a measurement result display means connected to said data storage portion.

* * * * *

UNITED STATES PATENT AND TRADEMARK OFFICE
CERTIFICATE OF CORRECTION

PATENT NO. : 4,922,752

DATED : May 8, 1990

INVENTOR(S) : Masahiro KITAZUME et al.

It is certified that error appears in the above-identified patent and that said Letters Patent is hereby corrected as shown below:

On the cover page of the patent, change "62-135,398" to ---62-135,395---.

In the abstract, line 2, change "then" to ---that---.

At column 1, line 37, change "be" to ----is--- after "it".

At column 1, line 38, change "is" to ---be--- after "components".

At column 3, line 38, change "drive" to ---drives---.

At column 3, line 61, change "synchronizm" to ---synchronism---.

At column 6, line 43, in claim 10, line 17, change "portions" to ---portion---.

At column 6, line 57, in claim 11, line 9, delete "through" (first occurrence).

At column 7, line 19, in claim 14, line 9, delete "through" (first occurrence).

At column 8, line 15, in claim 17, line 1, change "inegrating" to ---integrating---.

Signed and Sealed this

Twenty-sixth Day of May, 1992

Attest:

DOUGLAS B. COMER

*Attesting Officer*   *Acting Commissioner of Patents and Trademarks*